United States Patent
Schmitz et al.

(10) Patent No.: US 11,897,325 B2
(45) Date of Patent: Feb. 13, 2024

(54) FILLER TUBE FOR A FUEL TANK

(71) Applicant: KAUTEX TEXTRON GMBH & CO. KG, Bonn (DE)

(72) Inventors: Dieter Schmitz, Bonn (DE); Daniela Selig, Siegburg (DE); Claus Krueger, Much (DE); Harald Lorenz, Bad Neuenahr-Ahrweiler (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 844 days.

(21) Appl. No.: 16/097,581

(22) PCT Filed: Mar. 7, 2017

(86) PCT No.: PCT/EP2017/055305
§ 371 (c)(1),
(2) Date: Oct. 29, 2018

(87) PCT Pub. No.: WO2017/186387
PCT Pub. Date: Nov. 2, 2017

(65) Prior Publication Data
US 2019/0160940 A1    May 30, 2019

(30) Foreign Application Priority Data

Apr. 29, 2016   (DE) .................. 10 2016 207 477.6

(51) Int. Cl.
| | |
|---|---|
| *B60K 15/04* | (2006.01) |
| *F16L 47/02* | (2006.01) |
| *F16L 13/02* | (2006.01) |
| *B29C 49/20* | (2006.01) |
| *B29C 49/04* | (2006.01) |

(Continued)

(52) U.S. Cl.
CPC .............. *B60K 15/04* (2013.01); *B29C 49/04* (2013.01); *B29C 49/20* (2013.01);
(Continued)

(58) Field of Classification Search
CPC ......... F16L 47/02; F16L 47/041; F16L 13/02; F16L 13/10
See application file for complete search history.

(56) References Cited

U.S. PATENT DOCUMENTS

| | | | |
|---|---|---|---|
| 4,256,333 A * | 3/1981 | Jones ...................... | F16L 47/02 285/22 |
| 5,336,351 A * | 8/1994 | Meyers ............... | B29C 37/0082 156/158 |

(Continued)

FOREIGN PATENT DOCUMENTS

| | | | | |
|---|---|---|---|---|
| JP | 2005-041298 | | 2/2005 | |
| JP | 2005041298 A | * | 2/2005 | ............ B29C 66/65 |

OTHER PUBLICATIONS

English translation of International Preliminary Report on Patentability dated Oct. 4, 2018, received in corresponding PCT Application No. PCT/EP2017/055305.

(Continued)

*Primary Examiner* — Matthew Troutman
*Assistant Examiner* — Fannie C Kee
(74) *Attorney, Agent, or Firm* — Grossman, Tucker, Perreault & Pfleger, PLLC

(57) ABSTRACT

A filler tube for a fuel tank, having a tube portion made of plastic material and a tubular adapter, which is connected to the tube portion, for coupling the filler tube to the fuel tank, wherein a lateral surface of the adapter is integrally bonded, in particular welded, to a lateral surface of the tube portion, wherein the adapter and the tube portion overlap in the region of the integrally bonded connection.

16 Claims, 9 Drawing Sheets

(51) Int. Cl.
*B29L 23/00* (2006.01)
*B60K 15/03* (2006.01)
*B29L 31/30* (2006.01)
*B29L 31/00* (2006.01)

(52) U.S. Cl.
CPC ... *B29C 2049/2047* (2013.01); *B29L 2023/00* (2013.01); *B29L 2023/22* (2013.01); *B29L 2031/30* (2013.01); *B29L 2031/7172* (2013.01); *B60K 2015/0346* (2013.01); *B60K 2015/03467* (2013.01); *B60K 2015/0458* (2013.01); *B60Y 2410/122* (2013.01); *B60Y 2410/124* (2013.01)

(56) References Cited

U.S. PATENT DOCUMENTS

| | | | |
|---|---|---|---|
| 6,305,408 B1 | 10/2001 | Goto et al. | |
| 6,918,504 B2* | 7/2005 | Miura | B60K 15/00 137/351 |
| 6,931,729 B2* | 8/2005 | Hiramatsu | B23K 11/066 29/890.09 |
| 7,128,346 B2* | 10/2006 | Miyajima | B60K 15/035 285/204 |
| 2003/0173776 A1* | 9/2003 | Morohoshi | B29K 2309/08 285/189 |
| 2015/0290864 A1 | 10/2015 | Beck et al. | |
| 2016/0109042 A1* | 4/2016 | Hirohara | F16L 25/00 285/194 |

OTHER PUBLICATIONS

English translation of International Search Report dated Jun. 1, 2017, received in corresponding PCT Application No. PCT/EP2017/055305.

* cited by examiner

FILLER TUBE FOR A FUEL TANK

FIELD

The invention relates to a filler tube for a fuel tank, having a tube portion composed of plastic and a tubular adapter which is connected to the tube portion and which serves for the coupling of the filler tube to the fuel tank. The invention also relates to a tank system having a filler tube of said type. Finally, the invention relates to a method and a device for producing a filler tube for a fuel tank.

BACKGROUND

In the development of modern motor vehicles, there is the constant demand to further reduce pollutant emissions, firstly in order to comply with the ever more stringent legal requirements and secondly in order to meet the customer demand for extremely environmentally friendly vehicles. What are paramount here are the reduction of the weight of the vehicles and the reliable encapsulation of environmentally harmful substances, such as fuels or lubricants.

Against the background of these target objectives, this means that, for the development of tank systems which are made up of a fuel container and of a filler tube connected thereto, it is sought to realize the least possible diffusion-induced fuel emissions in a system of lightweight construction. Emissions values of known tank systems are approximately 20 to 30 mg per day, that is to say approximately 20 to 30 mg of fuel escape per day from such a tank system into the environment.

Tank systems which are produced from a metallic material have the advantage that little diffusion of the fuel occurs through the wall of the fuel container or of the filler tube. Furthermore, it is easy to produce a gas-impermeable and liquid-impermeable tube connection between a metallic fuel container and a metallic filler tube, such as for example a hose clamp connection.

The tank systems produced from metallic materials however have the disadvantage that they have a high weight and are expensive to produce. Furthermore, the hose clamp connection has the disadvantage that the installation of the filler tube, in particular in the event of the repair or maintenance of the tank system, is cumbersome and time-consuming, because the clamp must be fastened in poorly accessible regions with tightly restricted structural space.

Tank systems with plastics components, such as for example a filler tube for a fuel tank of the type mentioned in the introduction, have the advantage that they are of lighter weight than systems composed of metal and can furthermore be produced at lower cost. The filler tube is normally manufactured separately from the fuel tank and detachably connected to the fuel tank in an installation step.

In the coupling of a filler tube composed of plastic to a fuel container, a particular challenge consists in producing a robust connection which is gas-impermeable and liquid-impermeable even under usage conditions. In particular, a filler tube produced in a blow molding process cannot, owing to the creep tendency of the plastic and the tolerances inherent in this manufacturing process, be directly connected to a fuel container such that the connection is impermeable with regard to a diffusion of hydrocarbons.

To ensure a reliable connection of a filler tube produced in a blow molding process to a fuel tank, it is known for the filler tube to be equipped at an end side with an adapter by means of which a sealed tube connection to the tank can be produced. Here, a tube portion of the filler tube is firstly manufactured in a blow molding process, and after the cooling and the removal from the blow mold, said tube portion, in a separate welding process that follows the cooling process, is connected at the end side to the adapter. The end-side welding is performed with a butt joint, wherein heating elements are used to plasticize the end sides to be welded. To produce the welded connection to the adapter, the tube portion is therefore melted or plasticized again at the end side after the cooling.

The known method has the disadvantage that the separate molding and welding processes entail high costs and lead to long process times. The radially encircling butt weld seam furthermore has the disadvantage that it forms a structural weak point in particular with respect to tension and bending loads, and furthermore, increased diffusion of fuel into the surroundings takes place in this region, which increases the emissions values of the system composed of fuel container and filler tube overall. The diffusion-induced fuel emissions in the region of the butt weld seam amount to approximately 3 to 4 mg per day.

If the plastics tube has a multi-layer construction, it is necessary in the case of an end-side butt weld seam for the welded connection to be produced across the entire layer structure. Here, in particular, a barrier layer composed of EVOH can impair the quality of the welded connection, because EVOH can be welded only to a limited extent, or cannot be welded, to plastics such as HDPE or the like.

SUMMARY

Against this background, the invention is based on the technical problem of specifying a filler tube for a fuel tank, a tank system having a filler tube of said type, and a method and a device for producing a filler tube, wherein the filler tube can be produced inexpensively and in particular satisfies increased emissions requirements.

The filler tube according to the invention is characterized in that a lateral surface of the adapter is connected by integral bonding, in particular is welded, to a lateral surface of the tube portion, wherein the adapter and the tube portion are arranged so as to overlap in the region of the integrally bonded connection.

An overlapping arrangement means in the present case that the adapter and the tube portion engage into one another, or are pushed into one another, at least in portions, for example at an end side. In other words, the adapter and the tube portion may have a common longitudinal axis at least in the region of the integrally bonded connection, wherein the adapter projects axially into the tube portion or vice versa.

Consequently, in the region of the overlap, an inner lateral surface of the tube portion faces toward an outer lateral surface of the adapter, or vice versa, wherein the lateral surfaces are connected to one another, or transition into one another, without play and without a gap in a radial direction owing to the integrally bonded connection.

Where an inner lateral surface is referred to here, this is a surface which faces toward a common longitudinal axis of adapter and tube portion, whereas an outer lateral surface is oriented so as to be averted from the longitudinal axis.

In the present case, an axial direction extends along a common longitudinal axis, formed at least in the region of the integrally bonded connection, of the adapter and of the tube portion, whereas a radial direction is oriented transversely with respect to the axial direction and so as to point away from the longitudinal axis.

Contrary to previously known solutions, the adapter and the tube portion are consequently not connected with a butt joint at the end side, but rather are pressed axially one into the other in the region of the integrally bonded connection, such that lateral surfaces, facing toward one another, of adapter and tube portion can be connected to one another by integral bonding, in particular can be welded.

It has been found that, by means of the integrally bonded connection of the lateral surfaces, the diffusion-induced fuel emissions of the filler tube in the region of the connecting point of tube portion and adapter can be reduced. This may be based firstly on the fact that the region of the integrally bonded connection is, as viewed in a radial direction, enclosed on two sides by the adapter and the tube portion. Furthermore, the axial length of the diffusion path along the integrally bonded connection can be set, and optimized against the background of predefined emissions values, by means of the length of the overlap of adapter and tube portion. The connection of the lateral surfaces furthermore has the advantage that any barrier layer incorporated into the tube portion is not part of the welded connection. It is thus possible by means of the filler tube according to the invention to achieve emissions values of lower than or equal to 2 mg per day in the region of the integrally bonded connection.

The integrally bonded connection of the lateral surfaces furthermore has the advantage that, for example in relation to welded connections with a butt joint, greater strength is realized with regard to static and dynamic operating loads, in particular tensile and/or bending loads.

The filler tube according to the invention furthermore has the advantage that the connecting step between the adapter and the tube portion can be integrated into a blow molding process.

As will be presented in detail below for the method according to the invention, it is for example possible for the adapter to be held on a blow or calibrating mold of a blow molding apparatus and inserted at an end side into a tube portion or into a parison for the production of the tube portion. In interaction with the blow pin or calibrating pin, the adapter can close off the parison in gas-tight fashion for the molding of the tube portion. The integrally bonded connection between the adapter and the blow pin may for example be performed by virtue of the previously plasticized, or at least partially melted, lateral surfaces of adapter and tube portion being pressed against one another by means of a connecting device, which may be part of the blow molding apparatus.

The action of the adapter may therefore be performed already while the tube portion is still held in the blow molding tool. In particular, welding between the adapter and the tube portion may take place in the heat of the molding process, that is to say the introduction of energy or heat from a preceding extrusion and/or blow molding step can be utilized in the connecting step.

The overlapping component structure makes it possible for the filler tube to be produced in a relatively short time and with less outlay in terms of equipment and expenditure of energy, such that the manufacturing process is less expensive than previously known solutions.

Altogether, therefore, a filler tube for a fuel tank is provided which, owing to the integrally bonded connection of the lateral surfaces of the adapter and of the tube portion in an overlap region, can be produced inexpensively and in particular can attain emissions values of lower than or equal to 2 mg per day in the region of the integrally bonded connection.

In one refinement of the filler tube, the tube portion circumferentially encloses the adapter in the region of the integrally bonded connection. This arrangement promotes the integration of the connecting step between the adapter and the tube portion into a blow molding process. Accordingly, the tube portion, or a parison for the production of the tube portion, may be held open or expanded, in order for the adapter to be inserted at the end side, by application of an internal pressure in the plasticized state. The connection may subsequently be performed by radially inwardly directed deformation and pressing of the tube material against the outer contour or outer lateral surface of the adapter. It is thus possible in a simple manner for a separately prefabricated adapter to be connected to the tube portion within a blow molding device, wherein the blow molding apparatus has a connecting device for the connection of the tube portion to the adapter.

In a further refinement, the adapter is produced from a plastic. The plastic of the adapter may in particular be fiber-reinforced and/or weldable to the plastic of the tube portion. For example, a fiber-reinforced, modified polyamide may be connected, in particular welded, to a tube portion produced from HDPE or the like. The adapter may therefore be produced from a mono-material, that is to say from a single plastics material. In this context, "mono-material" is also to be understood as encompassing fiber-reinforced plastics, wherein the adapter comprises a single plastics material as matrix material. The adapter may consequently be produced inexpensively from a mono-material.

In an alternative refinement of the invention, the adapter is produced from at least two material components. Here, one component may be provided for structurally stiffening the adapter, whereas the second component is provided for forming the integrally bonded connection to the tube portion.

The adapter may have a main body which is produced from a metal or a plastic, in particular fiber-reinforced plastic. The main body may be manufactured for example from aluminum or from a fiber-reinforced, modified polyamide. The adapter may be encapsulated and/or coated with a further material, in particular HDPE, in the region provided for the connection of the tube portion. The second material is provided for the adhesive bonding and/or welding to the material of the tube portion. The second material may be applied with a layer thickness of up to 5 mm. The layer thickness of the second material preferably amounts to at most 1 mm, in order to realize a reliable connection, in particular by welding.

Alternatively or in addition, the lateral surface of the adapter may, in the region of the integrally bonded connection, be formed from a plastic, such as HDPE or the like, which is weldable to the plastic of the tube portion.

In particular, a region of the adapter which comprises the lateral surface to be connected may therefore have a thermoplastic material, such as HDPE or the like. In this way, it is possible for the adapter, in the region of the lateral surface to be connected, to be locally melted or plasticized in order to produce an integrally bonded connection to the tube portion. Here, it is in particular advantageous for the adapter and the tube portion to have thermoplastic materials which are compatible in the context of weldability.

The adapter may have molded elements or functional surfaces for forming a gas-impermeable and/or liquid-impermeable connection to a fuel container. Accordingly, the adapter may for example have detent elements and/or sealing surfaces which are complementary to a connection region provided on a fuel container.

To be able to produce a reliable integrally bonded connection, in particular welded connection, between the adapter and the tube portion in a simple manner, the tube portion may be produced in the same material as that which the adapter has in the region of its lateral surface to be connected. Said material may for example be a thermoplastic material that can be processed by blow molding.

In a further refinement of the filler tube, provision may be made for the tube portion to be produced from a material which differs from the region comprising the lateral surface, which is to be connected, of the adapter. Preferably, the materials of the tube portion and of the region comprising the lateral surface, which is to be connected, of the adapter are weldable to one another.

In one advantageous refinement of the filler tube, the adapter and the tube portion may have, in the region of the integrally bonded connection, a substantially circular cylindrical and/or a substantially conical shape. Provision may be made for the region of the integrally bonded connection to have a substantially circular cylindrical portion which is adjoined by a conical portion which radially widens in diameter. The circular cylindrical shape has the advantage that the lateral surfaces of tube portion and adapter can be easily pressed radially against one another between a blow or calibrating pin and slide inserts provided in a connecting device. Here, a circularly encircling integrally bonded connection formed between the lateral surfaces can preferably be realized with a single stroke movement of a means of just a single advancement of the slide inserts. This applies equally to a conical design of the region of the integrally bonded connection. The conical or circular cylindrical shape therefore permit a simple method implementation and machine kinematics.

Alternatively or in addition, the adapter may, in a region averted from the tube portion, have a cross section identical or similar to that in the region of the integrally bonded connection, in order to predefine or increase the flow speed of a liquid to be conducted through.

The adapter, at least in portions in a longitudinal section, may have a substantially conical cross section and/or be shaped in the manner of a stepped cylinder. Alternatively or in addition, the adapter may be of cylindrical, in particular circular cylindrical, shape at least in sections, and/or may have a larger cross section in a region averted from the tube portion then in the region of the integrally bonded connection.

The adapter may have a first region, which is designed for the connection of the tube portion, and a second region, which is provided for the mechanical coupling of the adapter to a fuel tank, wherein the second region may have in particular a larger diameter than the first region.

For example, the adapter may have at least two, preferably at least three, circular cylindrical portions of different diameter, which are each connected to one another via conical transitions. Whereas a first circular cylindrical portion comprises the lateral surface for the connection of the tube portion, a second circular cylindrical portion may serve for the abutment of a manipulation or cutting tool which serves for the handling of the adapter and/or for the separating-off of excess tube material in the region of the connecting point.

Alternatively or in addition, the adapter may have at least one end-side bevel. The bevel may preferably be shaped in a manner of an installation bevel in order to promote insertion of the adapter into the tube portion and conduct a fluid flow, such as compressed air or the like, which is possibly generated during the axial relative movement between the adapter and the tube portion, reliably through between the adapter and the tube portion.

According to a further aspect, the invention relates to a tank system for a motor vehicle, having a fuel tank or container and a filler tube, wherein the filler tube is designed in the manner described above, and wherein the adapter is detachably connected to the fuel tank, in particular by means of a clamping, detent or snap-action connection.

Owing to the above-described advantageous embodiment of the connection between the tube portion and the adapter, a fuel tank of said type is distinguished by particularly low emissions values. In particular, the emissions values of the integrally bonded connection in question here may be less than or equal to 2 mg per day.

By means of the preferably provided clamping, detent or snap-action connection, the installation of the filler tube on the fuel tank can be simplified, wherein simplified installation can be made possible in particular for repair or maintenance work.

According to a further aspect, the invention relates to a method for producing a filler tube for a fuel tank, having the method steps:
  a) providing a tube portion composed of plastic by:
     extruding a plastics hose which is provided for the formation of the tube portion by blow molding;
     introducing the plastics hose into a cavity of a tool for the blow molding;
     pre-forming the tube portion, in particular by closing the tool and/or applying an internal pressure to the hose interior, wherein the hose lies, at least in portions, against the tool;
  b) providing a tubular adapter which is provided for the connection of the filler tube to the fuel tank;
  c) connecting the adapter to the tube portion by means of a connecting device;
  wherein, in method step c),
     a lateral surface of the adapter is connected by integral bonding, in particular is welded, to a lateral surface of the tube portion, wherein
     the adapter and the tube portion are arranged so as to overlap in the region of the integrally bonded connection.

The above-described method has the advantage that the integrally bonded connection of the adapter to the tube portion can be integrated directly into the blow molding process. Accordingly, it is for example possible through the provision of the adapter and/or the integrally bonded connection of the adapter to the tube portion for the hose interior to be closed off in gas-tight fashion with respect to the surroundings, and for the tube portion to be brought into its final shape, abutting over substantially its full area against the tool, by application of an internal pressure or by means of a further increase of the internal pressure.

The method furthermore has the advantage that, by means of the possible integration of the connecting step between the adapter and the tube portion into the blow molding process, a separate connecting process following the production of the tube portion is rendered superfluous.

With the method according to the invention, an above-described filler tube according to the invention for a fuel tank can be produced.

The connecting device may have movable elements for pressing the tube portion radially against the adapter, or vice versa. The connecting device may be fastened to the blow molding tool or to a structural component which bears a blow and/or calibrating pin. The connecting device may be of multi-part design.

In one refinement of the method, in method step b), one of the steps inserting the adapter into an end-side opening of the tube portion; and/or positioning the adapter on a pin, such as a blow and/or calibrating pin, and inserting the pin and the adapter into an end-side opening of the tube portion; is carried out.

The adapter may consequently be provided so as to be movable relative to the tube portion, such that the adapter can be fed to a tube portion received in the cavity for the blow molding. Here, an end portion of the tube portion may project out of the cavity of the blow molding tool into a connecting region in which the connecting device connects, in particular welds and/or adhesively bonds, the adapter and the end portion of the tube.

In particular, the adapter may be held on a blow and/or calibrating pin. The pin may thus serve for the feed of a fluid for the application of pressure to the interior of the tube portion, such as for example compressed air, and/or for the calibration of a diameter of the adapter and/or of the tube portion. The method may therefore be carried out in an existing installation for blow molding, wherein use can be made of a pin modified or suitable for receiving the adapter.

The adapter may, in interaction with the pin, be provided for closing off the hose interior in gas-tight fashion, such that, as soon as the adapter has reached its intended position relative to the tube portion, the final shaping of the tube portion by blow molding and the integrally bonded connection can take place.

To facilitate the axially overlapping positioning of the adapter and of the tube portion, it may be provided in one refinement of the method that, during the insertion of the adapter into the tube portion, a fluid flow between the lateral surfaces to be connected is generated in order to form a gap, in particular an air gap, between the lateral surfaces. The fluid may be compressed air, which may be fed in particular by means of a blow pin.

By means of the fluid flow, it is possible for a flaring or widening of the tube portion to be performed, such that, during an axial relative movement of the lateral surfaces to be connected, for example of the adapter relative to the tube portion, no contact occurs between the lateral surfaces to be connected. In other words, the lateral surfaces, which are to be connected, of adapter and tube portion are held radially spaced apart by the fluid flow during the insertion of the adapter at the end side into the tube portion, such that no adhesive bonding or adhesion of the lateral surfaces to one another occurs during the feed process. If the lateral surfaces to be connected to one another each have a substantially circular cylindrical shape, the gap may be a substantially circularly encircling air gap between the lateral surfaces.

The integrally bonded connection of the lateral surfaces in method step c) may be achieved by virtue of the steps plasticizing at least one of the lateral surfaces by means of an introduction of energy, in particular an introduction of heat; and pressing the lateral surface of the adapter against the lateral surface of the tube portion, or vice versa;

being performed.

The plasticizing of the lateral surface of the adapter may in this case be realized by means of infrared radiation or hot air, whereas the lateral surface of the tube portion may still be in a weldable plastic state from the preceding extrusion process. In addition to the residual heat from the extrusion process, heat may be additionally fed to the lateral surface of the tube portion, in particular by means of an energy or heat source provided for the plasticizing of the lateral surface of the adapter. As a result of the subsequent pressing of the lateral surfaces together, the integrally bonded connection between the lateral surfaces is formed—the lateral surfaces are welded to one another.

In one refinement of the method, the adapter and the tube portion are pressed against one another by radial advancement of at least two slide inserts which are part of the connecting device, wherein the adapter is held in particular on a pin, such as a blow and/or calibrating pin, such that the adapter and the tube portion are pressed radially against one another between the slide inserts and the pin.

In order, in the region of the integrally bonded connection, to realize fully areal abutment of the lateral surfaces to be connected of the entire width of the connecting region to be provided, the tube portion may overlap the adapter axially beyond the lateral surface provided for the formation of the integrally bonded connection, such that, after the formation of the integrally bonded connection, excess tube material adheres to the filler tube.

To remove excess tube material, the method steps providing a cutting tool which circumferentially engages around the adapter; and separating off excess tube material by means of the cutting tool, wherein the cutting tool is in particular formed in two parts;

may be provided.

The cutting tool may be formed from two half-shells which circumferentially engage around a shoulder or a cylinder step of the adapter, wherein the shoulder or the cylinder step have a greater diameter than the diameter of the adapter in the region of its lateral surface provided for the formation of the integrally bonded connection.

According to a further aspect, the invention relates to an apparatus for producing a filler tube for a fuel tank, having a tool which has a cavity for the blow molding of a tube portion from plastic, and a receptacle for holding a tubular adapter which is provided for the coupling of the filler tube to the fuel tank. The apparatus is distinguished by the fact that a connecting device for the integrally bonded connection of the adapter to the tube portion is provided, which connecting device is designed to connect the lateral surface of the adapter by integral bonding, in particular to weld said lateral surface, to a lateral surface of the tube portion, wherein the adapter and the tube portion are arranged so as to overlap in the region of the integrally bonded connection.

The apparatus is thus firstly provided for the production of the tube portion by blow molding, and is secondly suitable for producing an integrally bonded connection between the lateral surfaces of adapter and tube portion. With the apparatus according to the invention, a filler tube according to the invention can be produced quickly and inexpensively, and the method according to the invention can be carried out.

In a further refinement of the apparatus, the connecting device may have a pin, in particular a blow and/or calibrating pin, for receiving the adapter, and at least two slide inserts, which are part of the connecting device, for pressing the tube portion against the adapter, or vice versa. The connecting device can consequently be easily integrated into an existing apparatus for the blow molding of a tube portion, through the provision of a blow pin suitable for receiving the adapter and of slide inserts.

In one refinement, the apparatus has a cutting tool for separating off excess tube material, wherein the cutting tool is in particular formed in two parts. In addition to the molding and the connection of the tube portion, the apparatus may therefore also be configured for the reworking of the connection point, such that preferably a finished end product can be removed from the apparatus.

In one refinement of the apparatus, the cutting tool has a holding surface, which is provided for circumferential abutment against the adapter, and a separating surface, which is provided for abutment against the connecting device, wherein the holding surface and the separating surface converge in particular at an acute angle so as to form a cutting edge.

The connecting device may have an abutment surface which may be of substantially complementary shape with respect to the separating surface of the cutting tool, which permits end-side abutment of the cutting edge. By means of an axial movement of the cutting tool in the direction of the connecting device, the abutment surface can be brought into contact with the separating surface or with the cutting edge, in particular in order to separate off excess tube material.

BRIEF DESCRIPTION OF THE DRAWINGS

The invention will be described in more detail below on the basis of a drawing, which illustrates exemplary embodiments. In the drawing, in each case schematically.

DETAILED DESCRIPTION

Figure 1A:
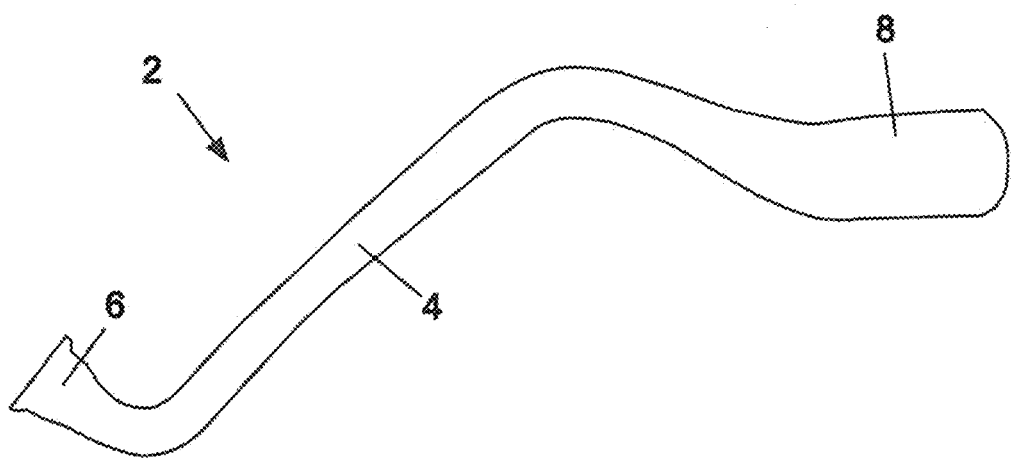
FIG. 1A shows a filler tube for a fuel tank in a perspective view.

FIG. 1A shows a filler tube 2 for a fuel tank (not illustrated). The filler tube 2 has a tube portion 4 composed of plastic. In the present case, the tube portion 4 has been produced from a thermoplastic material. The tube portion 4 may be produced in single-layer form from a plastic. The tube portion 4 may alternatively be produced in multi-layer form from a co-extruded hose material that has been molded within a blow mold by application of internal pressure. The tube portion 4 may, by means of the blow molding process, be molded so as to be bent in at least two spatial directions.

The filler tube 2 has a tubular adapter 6, which is connected to the tube portion 4. The adapter 6 serves for the coupling of the filler tube 2 to the fuel tank. At an end portion 8, situated opposite the adapter 6, of the filler tube 2, the tube portion 4 is of enlarged diameter, wherein said enlarged end portion 8 is, in the fully installed state, assigned to a filler head for the feed of fuel in a motor vehicle.

Figure 1B:
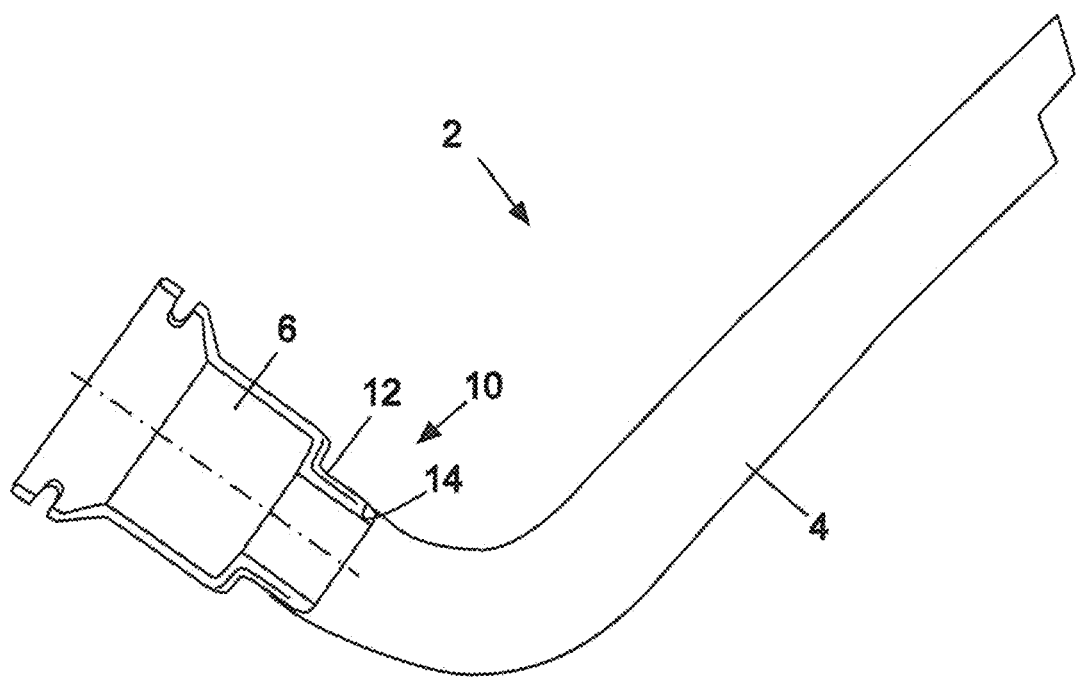
FIG. 1B shows the filler tube from FIG. 1A in a longitudinal section.

FIG. 1B illustrates the adapter-side part of the filler tube 2 from FIG. 1A in a longitudinal section. The tube portion 4 and the adapter 6 are connected to one another by integral bonding in a region 10, wherein, in the present case, an outer lateral surface 12 of the adapter 6 is welded to an inner lateral surface 14 of the tube portion 4. The adapter 6 and the tube portion 4 are arranged so as to overlap in the region 10 of the integrally bonded connection. In the present case, the tube portion 4 circumferentially engages around the adapter 6 in the region 10 of the integrally bonded connection. In other words, the adapter 6 and the tube portion 4 are pushed axially into one another, or arranged in nested fashion one inside the other, in the region 10 of the integrally bonded connection.

Figure 2A:
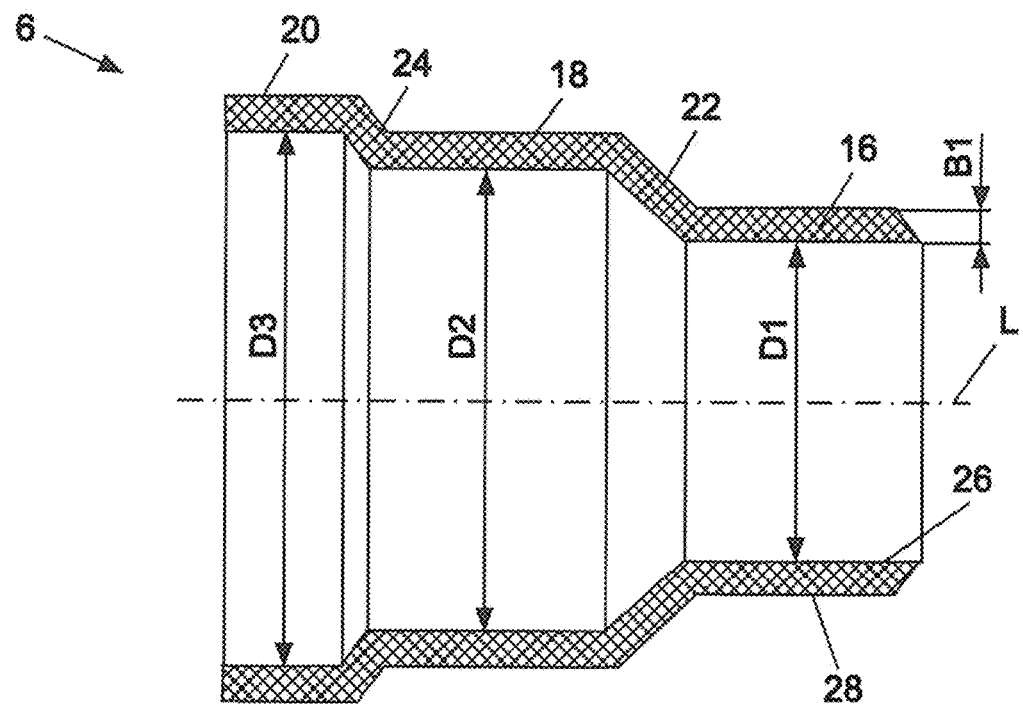
FIG. 2A shows an adapter for a filler tube in a longitudinal section.

FIG. 2A shows an embodiment of an adapter 6 for a filler tube 2 in a longitudinal section along a longitudinal axis L. The adapter 6 is formed in the manner of a stepped cylinder and has three portions 16, 18, 20 of circular cylindrical form with the diameters D1, D2, D3. The diameter D1 may for example be 32 mm, the diameter D2 may for example be 38 mm, and the diameter D3 may for example be 44 mm. It is self-evident that the numerical values stated above, and all of the numerical values presented below, are to be understood as examples, and the individual components may be adapted in terms of the dimensions to the respective usage situation. The wall thickness B1 of the adapter 6 from FIG. 2A may for example be approximately 2.5 mm.

The portion 16 with the diameter D1 is connected via the conical portion 22 to the portion 18, which has the diameter D2. The portion 18 is in turn connected via the conical portion 24 to the portion 20, which has the diameter D3.

The adapter 6 has an inner lateral surface 26, which faces toward the longitudinal axis L, and an outer lateral surface 28, which is averted from the longitudinal axis L. That part of the outer lateral surface 28 in which the portion 16 and the conical portion 22 are formed is provided for the formation of an integrally bonded connection to the tube portion 4. The adapter 6 as per FIG. 2A is produced from a mono-material, which is weldable to a tube portion 4.

Figure 2B:
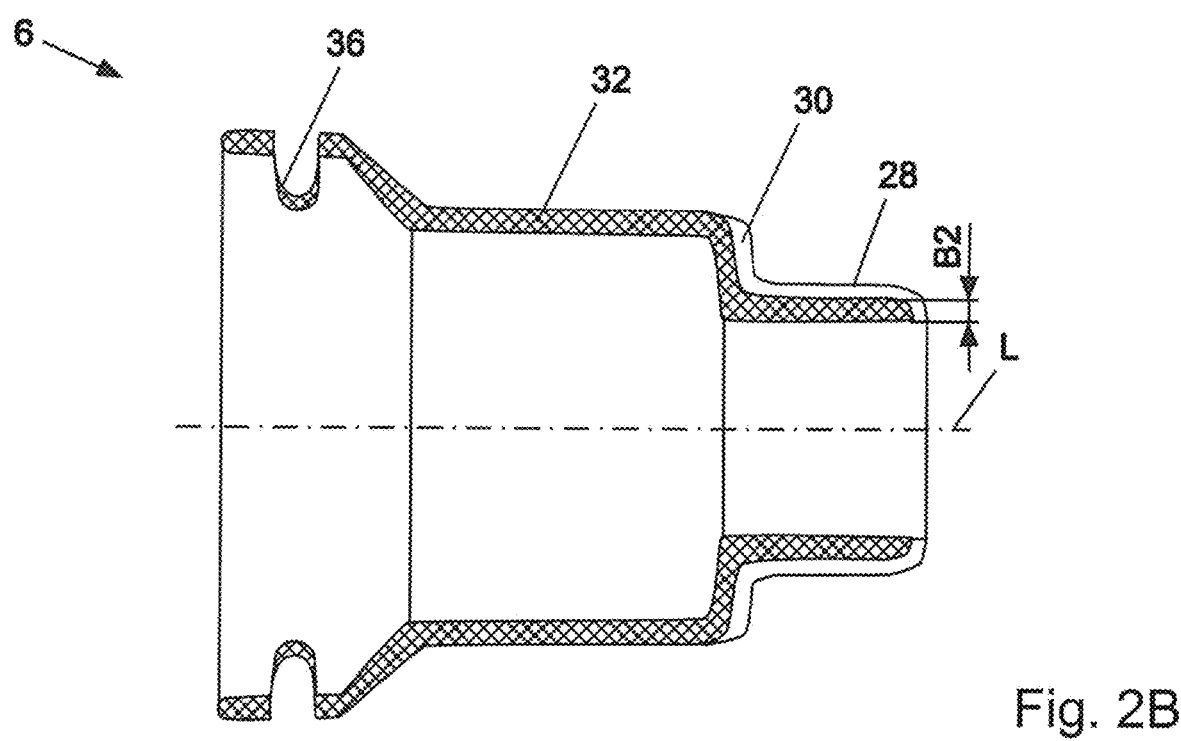
FIG. 2B shows a further adapter for a filler tube in a longitudinal section.

FIG. 2B shows a further adapter 6 for a filler tube 2 in a longitudinal section. The adapter 6 shown in FIG. 2B is produced from two plastics components.

A main body 32 of the adapter 6 is composed of a fiber-reinforced polyamide. The main body 32 is coated or encapsulated in a region 30 with a second plastics component. The region 30, which comprises the lateral surface 28 to be connected, is composed of modified HDPE, which are suitable for welding to the material of the tube portion 4. In the present case, the region 30 is a layer of modified HDPE. The adapter 6 from FIG. 2B is thus formed in two layers. The wall thickness B2 of the adapter 6 is in the present case 2.5 mm+/−0.1 mm. The thickness of the layer 30 of HDPE has a layer thickness of at most 1 mm. In further embodiments of the invention, provision may be made for the thickness of the layer 30 to amount to less than 1 mm or up to and including 5 mm.

Whereas the modified HDPE of the region 30 serves for the integrally bonded connection of the adapter 6 to the tube portion 4, the main body 32 composed of fiber-reinforced plastic is provided for the dimensional stability of the component, and also serves for the detachable coupling of the adapter 6 to a fuel tank (not illustrated). For this purpose, the adapter 6 has molded elements 36 which are provided for the formation of a clamping, detent or snap-action connection to molded elements and/or seal elements of complementary shape formed on the fuel tank. In the present case, the adapter 6 has a circularly encircling groove 36 which is provided for interacting with molded elements of the fuel tank.

Figure 3A:
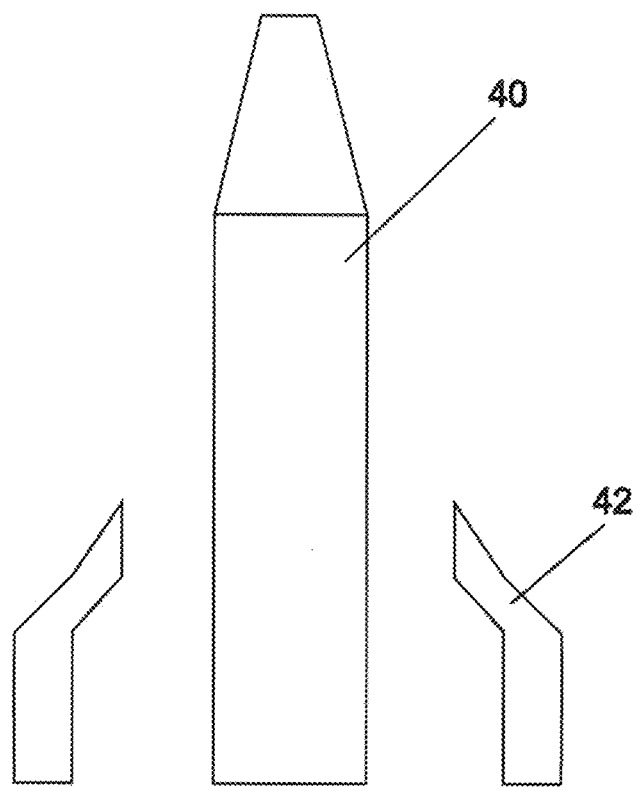
FIG. 3A shows a blow pin and a cutting tool for receiving an adapter.
Figure 3B:
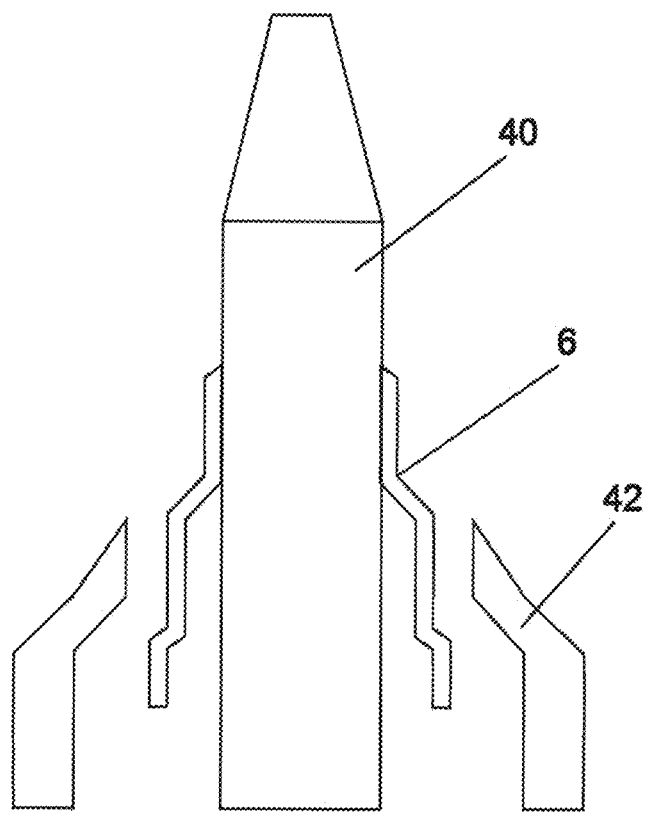
FIG. 3B shows the blow pin and the cutting tool from FIG. 3A with an adapter.

FIG. 3A shows a blow pin 40 and a cutting tool 42. The blow pin 40 is provided for receiving the adapter 6 from FIG. 2A or FIG. 2B, as illustrated by way of example in FIG. 3B for the adapter 6 from FIG. 2A.

Figure 4A:
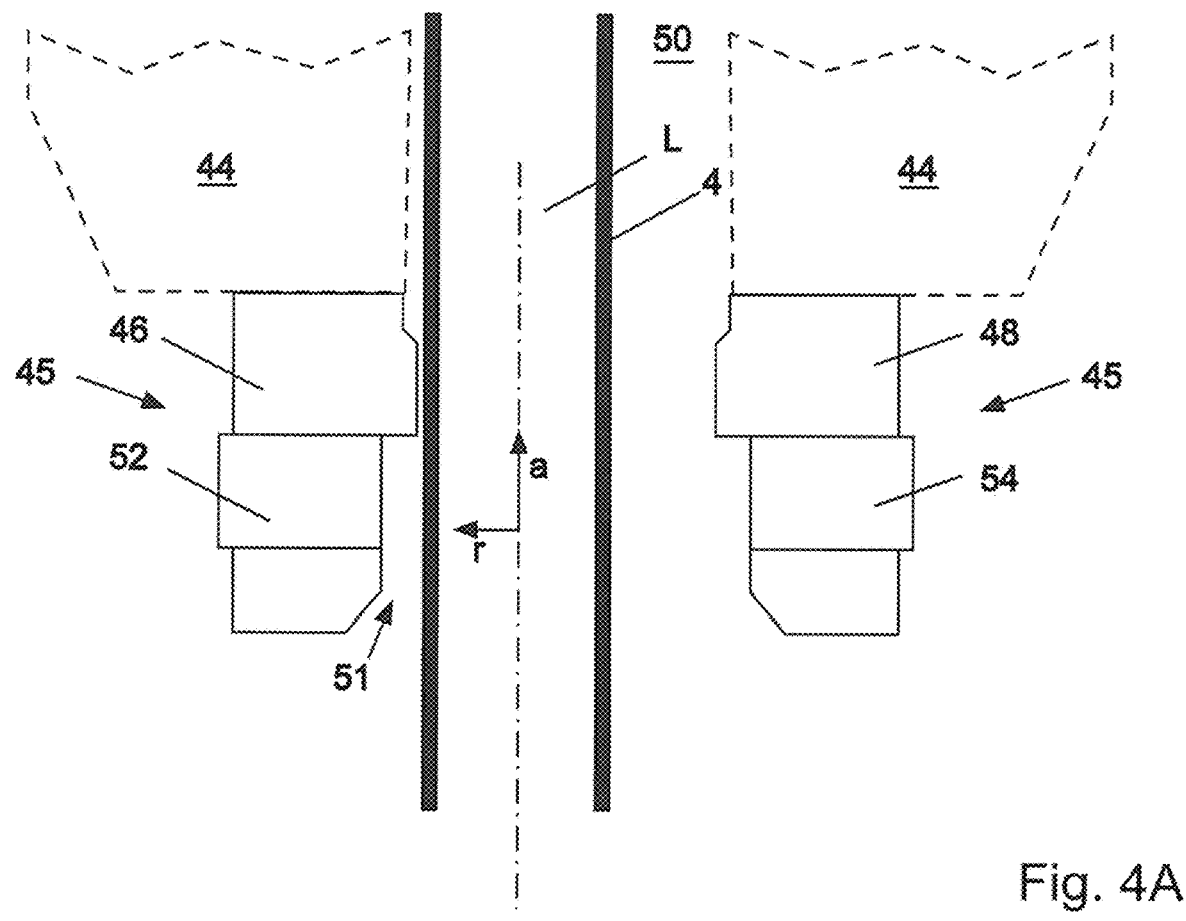
FIG. 4A shows a blow mold in cross section in a first position.

FIG. 4A illustrates a two-part tool 44 for the blow molding, the blow mold 44. The mold halves of the blow mold 44 form a cavity 50 which is provided for the molding of the tube portion 4.

Also provided is a connecting device 45 which has tool halves 46, 48 and slide inserts 52, 54, which are provided for pressing the tube portion 4 against the adapter 6. The tool halves 46, 48 are fastened to the mold halves of the blow mold 44.

The tube portion 4 is firstly provided in the form of a hose by means of a prior extrusion process, as illustrated in FIG. 4A. In FIG. 4A, the blow mold 44 and the slide inserts 52, 54 are situated in an open position. In this position, the hose 4, which is provided for the molding of the tube portion 4 by blow molding, can be introduced into the cavity 50 of the blow mold 44, and into a receiving region 51 of the connecting device 45, from an extrusion direction (not illustrated) provided vertically above the blow mold 44.

For better comprehensibility of the statements below, an axial direction a and a radial direction r will be introduced, wherein the axial direction a is oriented along a longitudinal axis L of the tube portion 4 or of the hose 4, whereas the radial direction r extends transversely with respect thereto. The blow mold 44 is, for a better overview of the subsequent illustrations, indicated only in FIG. 4A.

Figure 4B:
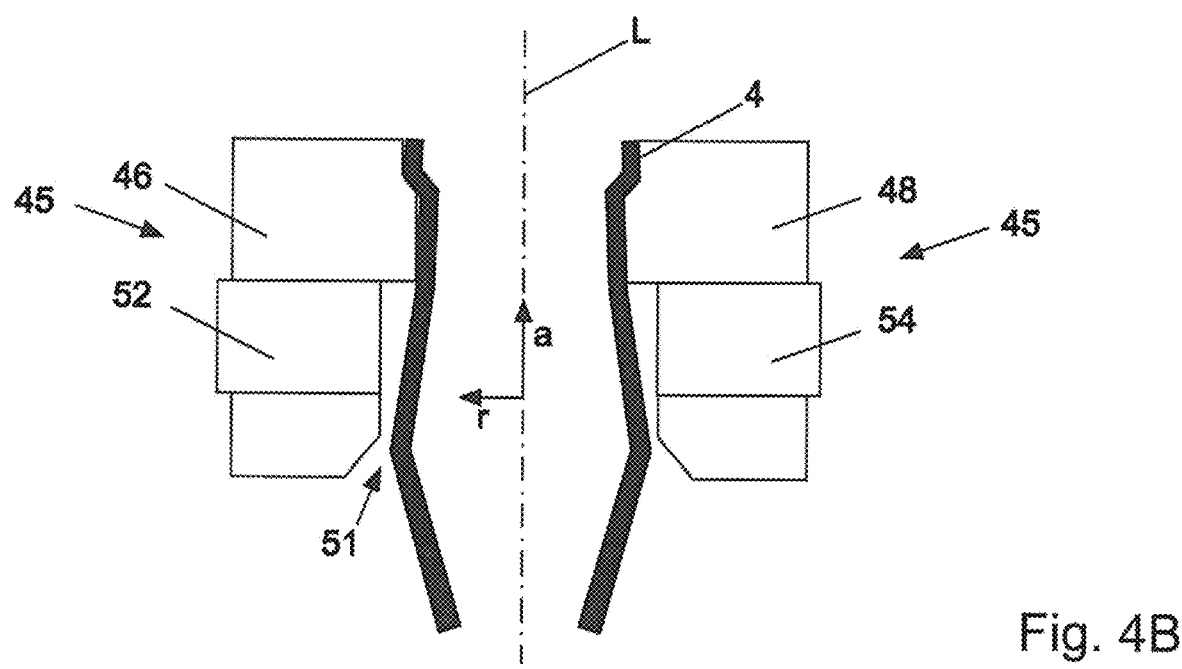
FIG. 4B shows the blow mold from FIG. 4A in a second position.

In FIG. 4B, the tool halves 46, 48 of the connecting device 45 have been moved into a second position, such that the hose 4 has at least partially laid against the respective inner contour of the tool halves 46, 48.

FIGS. 5A to 5G illustrate an apparatus 56 according to the invention for producing the filler tube 2 by means of the method in question. It is self-evident that FIG. 4 and FIG. 5 illustrate only the end portion of the tube portion 4 directly assigned to the adapter 6 and to the connecting device 45, whereas the tube portion 4, as shown in FIG. 1A, continues within the cavity 50 of the blow mold 44, in a form curved at least in two spatial directions, as far as an end portion 8 which is not illustrated in FIGS. 4 and 5.

The apparatus 56 comprises a connecting device 45, which is fastened to the blow mold (not illustrated), the blow pin 40, which serves for receiving the adapter 6, the slide inserts 52, 54, and the two-part cutting tool 42, which is formed from two half-shells. The slide inserts 52, 54, the tool halves 46, 48 and the blow pin 40 together form the connecting device 45 for the integrally bonded connection of the adapter 6 to the tube portion 4. In addition to the abovementioned elements, the connecting device 45 may have an energy or heat source (not illustrated) which serves for the plasticization of a region 30 of the adapter, or of the material of the lateral surface 28.

A method according to the invention will be described in more detail below on the basis of FIGS. 5A to 5G.

Figure 5A:
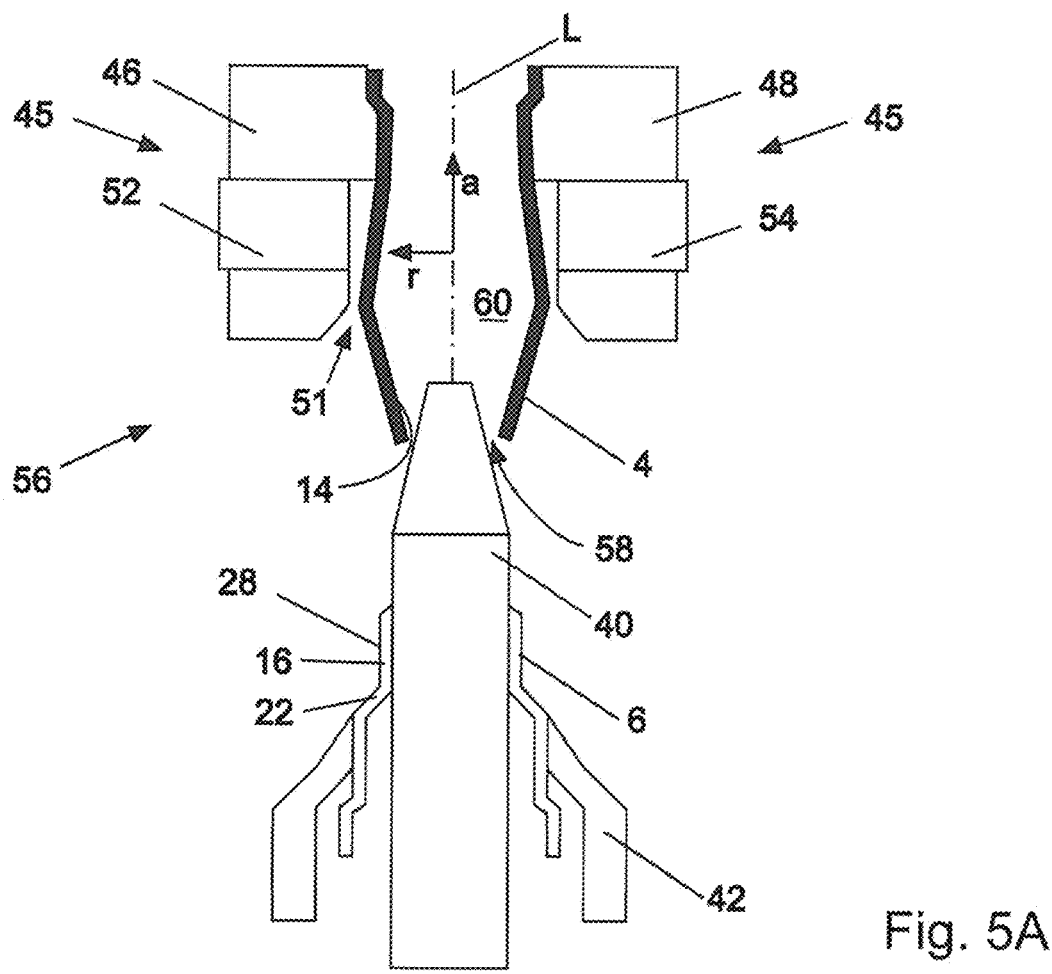
FIGS. 5A-5G show an apparatus for producing a filler tube in a cross section.

Firstly, the blow pin 40 together with the adapter 6 and the cutting tool 42, the half-shells of which circumferentially engage around the adapter 6, is moved axially along the direction a (FIG. 5A). The blow pin 40 and the adapter 6 are in this case inserted into an end-side opening 58 of the hose 4 until the adapter 6 and the tube portion 4 overlap in the portions 16 and 22 of the adapter 6 (FIG. 5C).

Figure 5B:
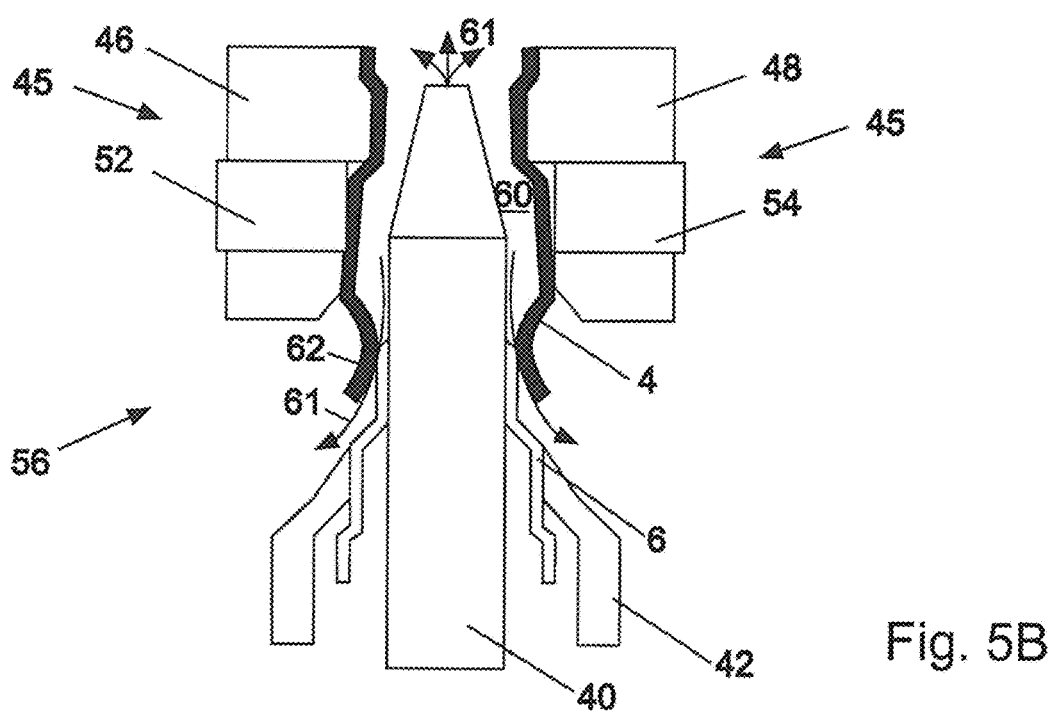
Figures 5C, 5D:
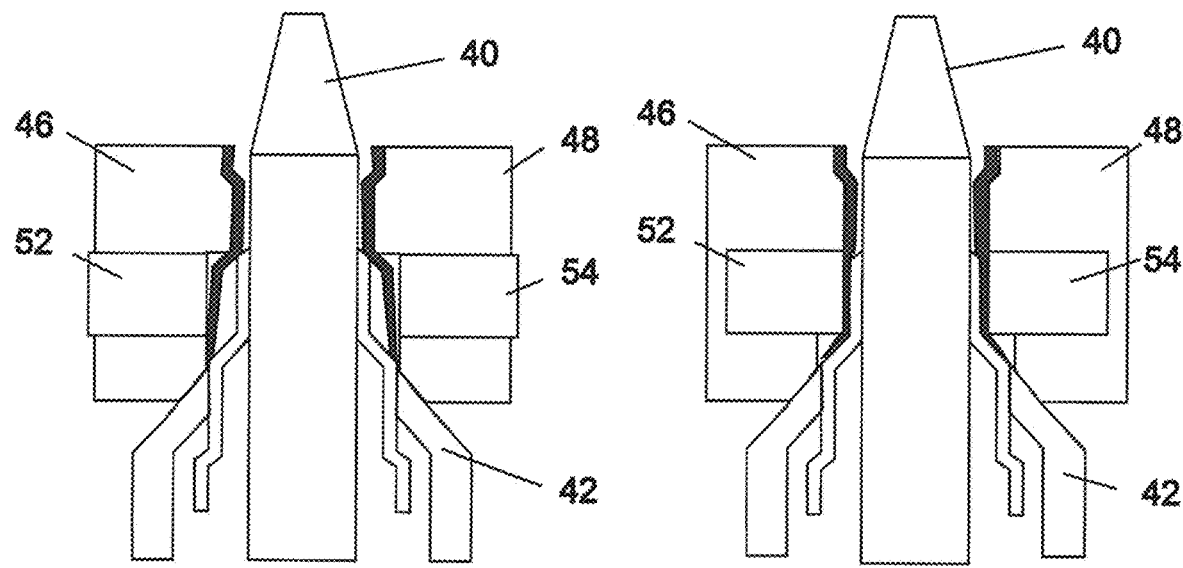
Figures 5E, 5F:
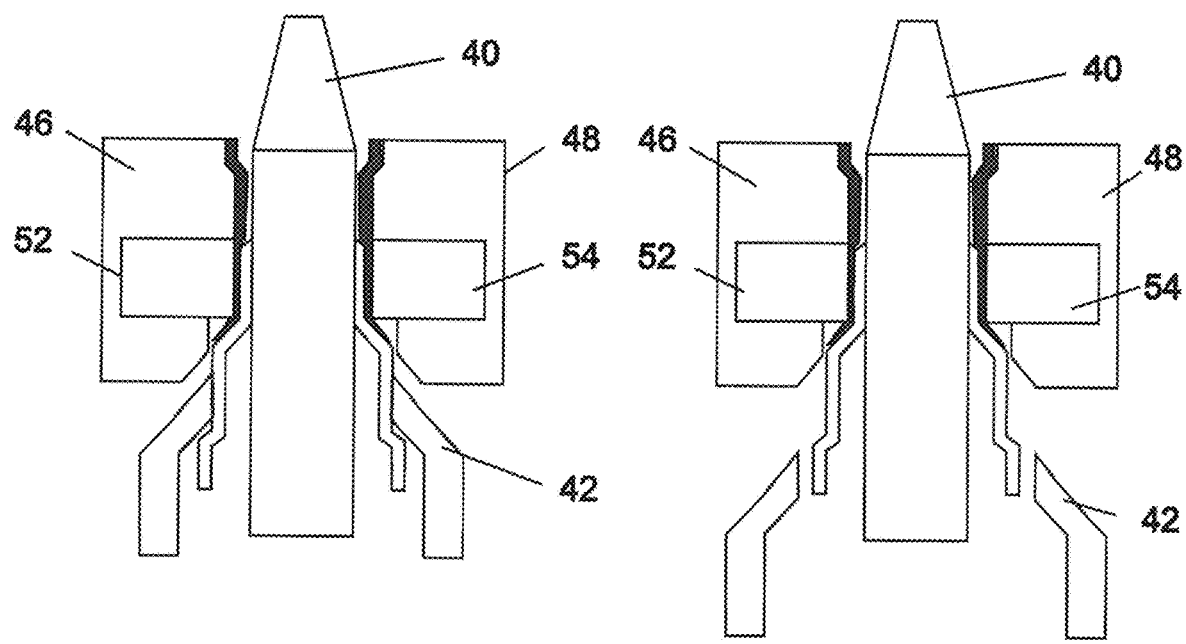
Figure 5G:
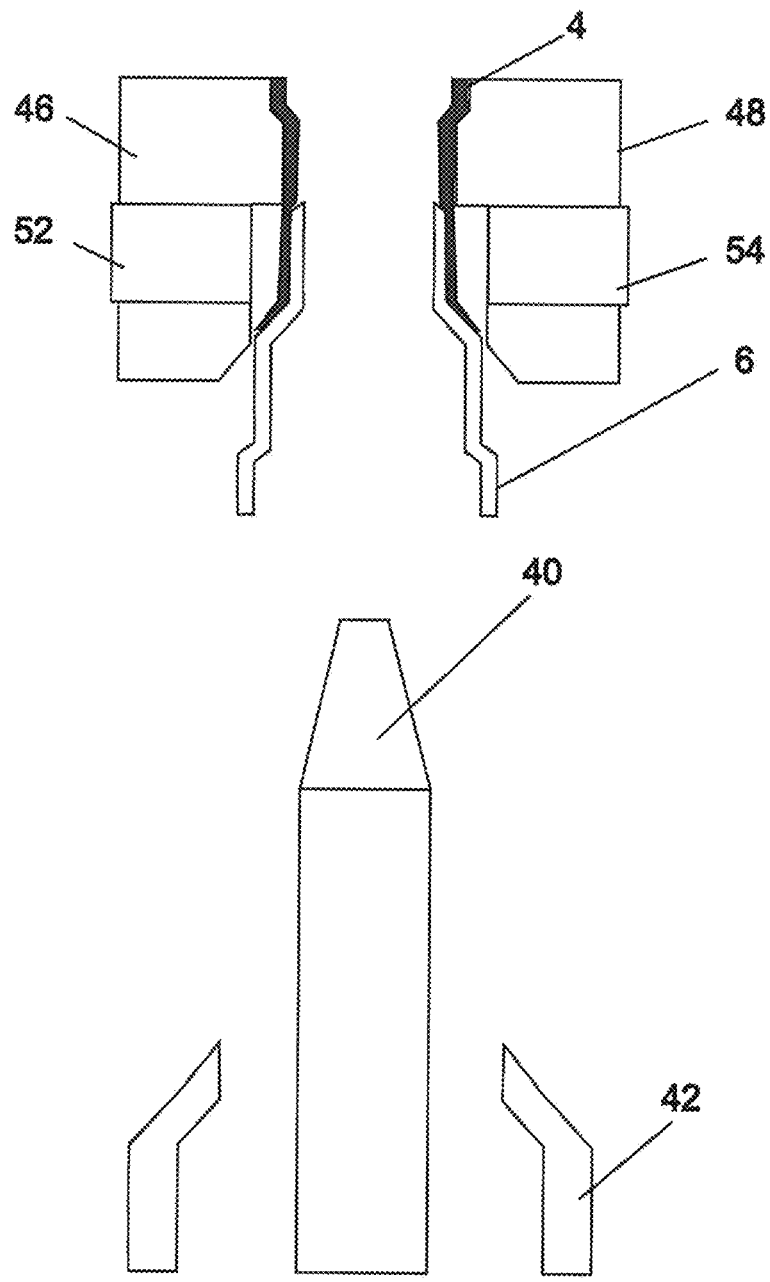

During the end-side insertion of blow pin 40 and adapter 6 into the hose 4, compressed air is introduced into the interior 60 of the hose 4 via the blow pin 40 in order to generate an air flow 61 between the hose 4 and the adapter 6 or the blow pin (FIG. 5A, FIG. 5B). In this way, a widening or flaring of the end region 62, assigned to the end-side opening 58, of the hose 4 is realized, such that an adhesion of the hose 4 to the blow mold 40 or to the adapter 6 during this axial relative movement is prevented. In the present case, the compressed air is fed via a channel (not illustrated) integrated into the blow mold 40. In alternative embodiments of the invention, provision may likewise be made for the pin 40 to merely be a calibrating pin which comprises no means for conducting or feeding compressed air, such that, in this case, the compressed air is fed from an oppositely arranged blow pin which is assigned to an end 8, averted from the adapter 6, of the tube portion 4.

As soon as the axial relative movement has come to an end (FIG. 5C), the interior space 60 of the hose 4 is sealed off with respect to the surroundings, such that, owing to the internal pressure, the hose 4 lies substantially completely against the inner contour of the tool halves 46, 48 and the tube portion 4 is molded from the hose 4 in the cavity 50 of the blow mold 44.

The lateral surfaces 14, 28, facing toward one another, of tube portion 4 and adapter 6 are pressed against one another by means of a radial advancement of the slide inserts 52, 54. Correspondingly to the illustration as per FIG. 2B, the lateral surface 28 of the adapter preferably has modified HDPE in the region of the lateral surface 28, which modified HDPE has been at least partially plasticized or melted by means of an introduction of heat prior to the pressing action. The inner lateral surface 14 of the tube portion 4 is still in the at least partially plasticized or molten state as a result of the prior extrusion process.

As a result of the tube portion 4 and the adapter 6 being pressed against one another in the region of the lateral surfaces 14, 28 to be connected, the adapter 6 and the tube portion 4 are welded together and thus non-detachably connected to one another by integral bonding. The integrally bonded connection is formed both in the cylindrical portion 16 and in the conical portion 22. Excess material of the tube portion is separated off by the cutting tool 42.

After the pressing-together of tube portion 4 and adapter 6, the cutting tool 42 and the blow pin 40 are moved out of the region of the connecting device 45 (FIG. 5D to FIG. 5G).

Figure 6A:
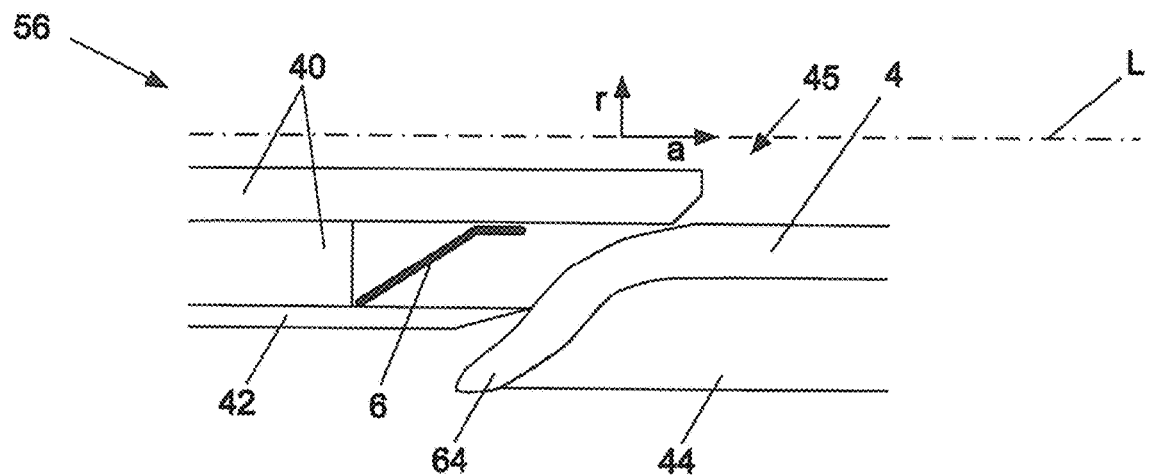
FIG. 6A shows a further apparatus for producing a filler tube in a cross section in a first position.
Figure 6B:
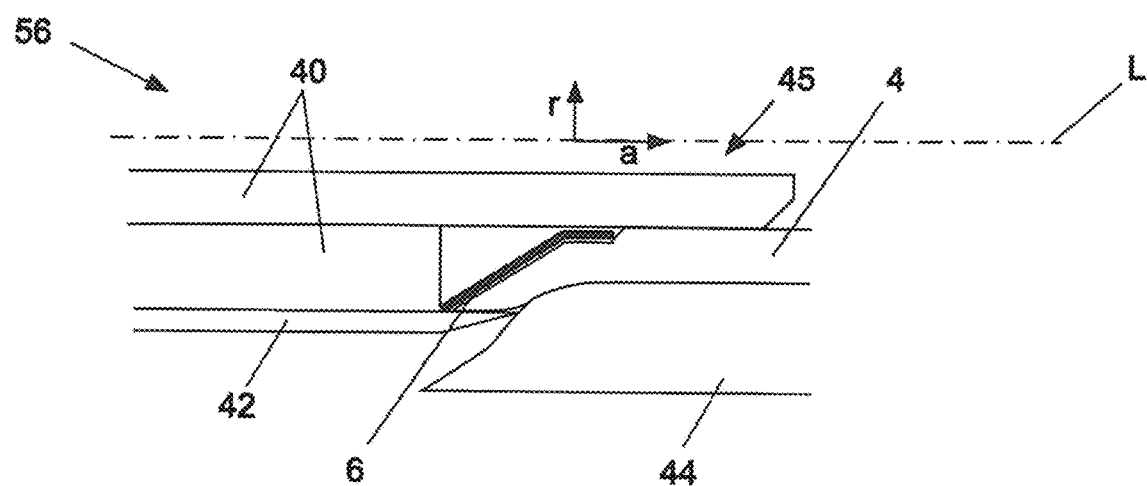
FIG. 6B shows the apparatus from FIG. 6A in a second position.

FIGS. 6A and 6B show, in a detail, the interaction of blow pin 40, cutting tool 42 and blow mold 44 as per an alternative embodiment of an apparatus 56 for producing a filler tube 2 for a fuel tank. In this embodiment of the apparatus 56, the connection or pressing-together between the adapter 6 and the tube portion 4 are performed by means of an axial relative movement of the blow pin 40 from a first position (FIG. 6A) in the direction of the blow molding tool 44 into a second position (FIG. 6B). The connecting device 45 is thus formed in the present case by the blow mold 44 and the blow pin 40.

Excess tube material 64 (flash) is separated off by means of the cutting tool 42. The connection of adapter 6 and tube portion 4 can thus be realized without additional slide inserts.

FIGS. 7A to 7D show, in a detail, the interaction of blow pin 40, cutting tool 42 and blow mold 44 as per a further alternative embodiment of an apparatus 56 for producing a filler tube 2 for a fuel tank. The connecting device 45 is formed by the blow mold 44 and the blow pin 40.

In a first step (FIG. 7A), the blow pin 40 is inserted into an end-side opening of the hose 4. Here, the adapter 6 is seated on the blow pin 40, which adapter has a shape which differs from FIGS. 6A and 6B and which is conically tapered at the end side in the direction of the hose 4. Via the blow pin 40, an internal pressure is applied to the hose 4. The arrow illustrated on the left in FIGS. 7A to 7D indicates in each case the engagement movement of blow pin 40, adapter 6 and cutting tool 42.

In a second step (FIG. 7B), the blow mold 40, together with the adapter 6 and the cutting tool 42, engages further into the blow molding tool 44, and is placed in contact with the hose 4 or the tube portion 4. The hose material has, proceeding from the position illustrated in FIG. 7A, been partially pushed out of the blow molding tool 44, or has partially flowed out of the blow molding tool 44, as a result of the application of internal pressure.

Figure 7A:
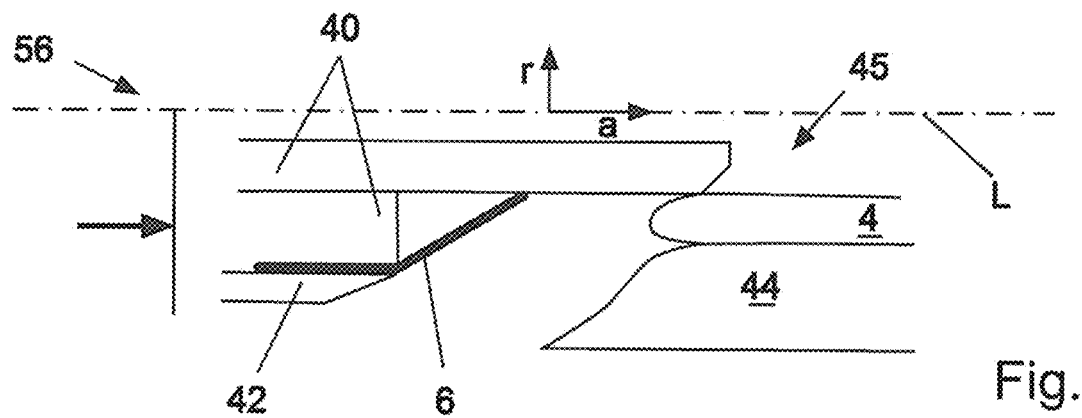
FIGS. 7A-7D show a further apparatus for producing a filler tube in a cross section.
Figure 7B:
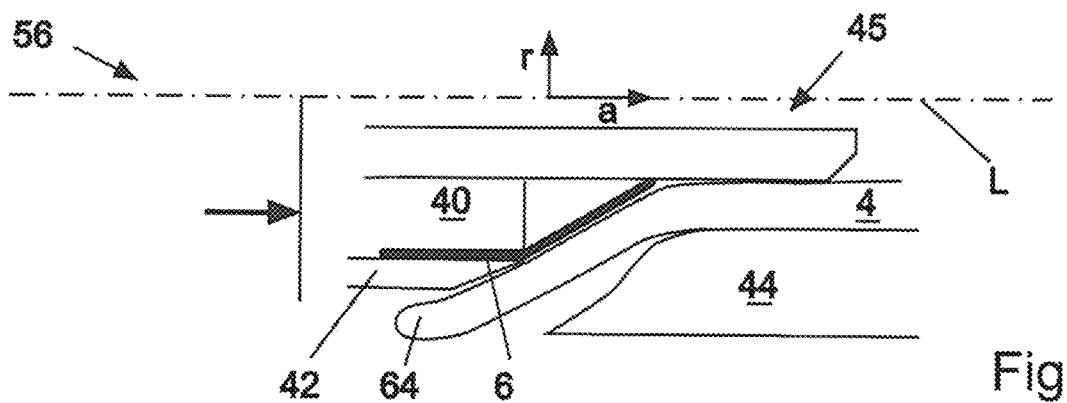
Figure 7C:
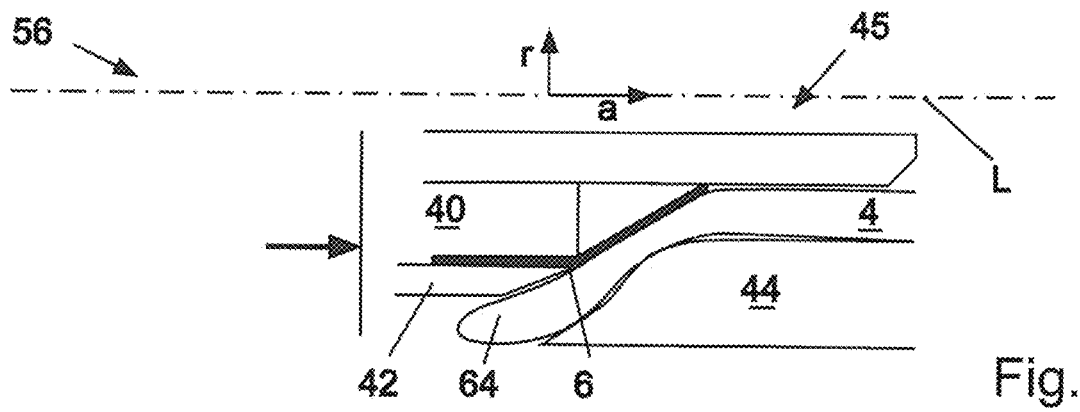
Figure 7D:
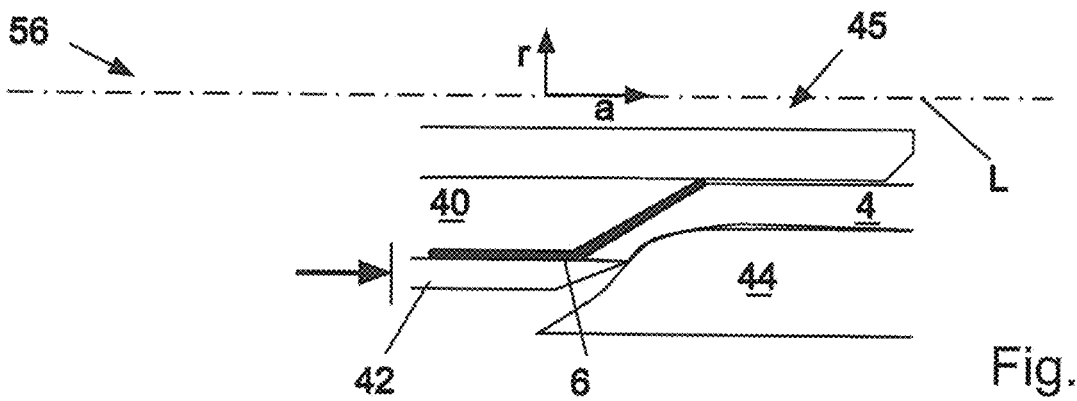

As can be seen in FIG. 7C, the adapter 6 and the still-plastic tube portion 4 are pressed against one another between the blow mold 40 and the blow-molding tool 44.

In a final step (FIG. 7D), the cutting tool 42 is moved in the direction of the blow-molding tool 44 and is placed in contact with the latter in order to separate off excess tube material 64.

LIST OF REFERENCE DESIGNATIONS

2 Filler tube
4 Tube portion, hose
9 Adapter
8 End portion
10 Region
12 Lateral surface of the adapter 6
14 Lateral surface of the tube portion 4
16 Portion with diameter D1
18 Portion with diameter D2
20 Portion with diameter D3
22 Conical portion
24 Conical portion
26 Inner lateral surface
28 Outer lateral surface
30 First region
32 Second region
36 Molded elements, groove
40 Blow pin
42 Cutting tool
44 Blow mold
45 Connecting device
46 Tool half
48 Tool half
50 Cavity
51 Receiving region
52 Slide insert
54 Slide insert
56 Device
58 End-side opening
60 Interior of the hose 4
61 Air flow
62 End region of the hose 4
64 Excess pipe material
B1 Wall thickness of the adapter 6 from FIG. 2A
B2 Wall thickness of the adapter 6 from FIG. 2B
L Longitudinal axis
r Radial direction
a Axial direction

What is claimed is:

1. A fuel tank filler tube for a fuel tank, comprising:
a tube portion formed of plastic; and
a tubular adapter which is connected to the tube portion and which couples the filler tube to the fuel tank,
wherein a lateral surface of the adapter is connected to a lateral surface of the tube portion by an integrally bonded connection,
wherein the adapter and the tube portion are arranged so as to overlap in a region of the integrally bonded connection,
wherein the adapter is produced from at least two material components,
wherein the first material component of the at least two material components is provided to structurally stiffen the adapter and the second material component of the at least two material components is provided to form the integrally bonded connection to the tube portion,
wherein the lateral surface of the adapter is, in the region of the integrally bonded connection, formed from a plastic which is weldable to the plastic of the tube portion,
wherein the adapter in the region of the integrally bonded connection is two-layered comprising a first layer and a second layer,
wherein the lateral surface of the adapter is provided by the first layer and formed of the second material component,
wherein the first layer covers a main body being the second layer,
wherein the second layer is formed of the first material component, and
wherein the adapter comprises at least two circular cylindrical portions of different diameter, which are each connected to one another via a conical transition, wherein a first circular cylindrical portion of the at least two circular cylindrical portions and the conical transition comprises the lateral surface connected to the tube portion such that the first circular cylindrical portion and the conical transition of the adapter are both in direct contact with the tube portion.

2. The filler tube as claimed in claim 1, wherein the tube portion circumferentially encloses the adapter in the region of the integrally bonded connection.

3. The filler tube as claimed in claim 1, wherein the main body of the adapter is formed of a metal or a fiber-reinforced plastic.

4. The filler tube as claimed in claim 1, wherein the adapter, at least in a portion of a longitudinal section has a shape of a stepped cylinder.

5. The filler tube as claimed in claim 1, wherein the integrally bonded connection comprises a pressure welded connection.

6. The filler tube as claimed in claim 1, wherein the integrally bonded connection consists of an adhesive connection.

7. The filler tube as claimed in claim 1, wherein the lateral surface of the adapter comprises a cylindrical surface, wherein the cylindrical surface extends from a shoulder or a cylindrical step of the adapter to a terminal end of the adapter, and wherein the integrally bonded connection extends from the shoulder or the cylindrical step of the adapter to the terminal end of the adapter.

8. The filler tube as claimed in claim 1, wherein the adapter, at least in a portion of a longitudinal section, has a larger cross section in a region averted from the tube portion than in the region of the integrally bonded connection.

9. The filler tube as claimed in claim 1, wherein the adapter, at least in a portion of a longitudinal section, has at least one end-side bevel.

10. A tank system for a motor vehicle, comprising:
   a fuel tank; and
   the filler tube as claimed in claim 1, wherein the adapter is detachably connected to the fuel tank, by a clamping, detent or snap-action connection.

11. A method for producing a fuel tank filler tube for a fuel tank, comprising:
   a) providing a tube portion formed of plastic by
      extruding a hose formed of plastic which is provided for formation of the tube portion by blow molding;
      introducing the hose into a cavity of a tool for the blow molding;
      pre-forming the tube portion by closing the tool and/or applying an internal pressure to the hose interior, wherein the hose lies, at least in portions, against the tool;
   b) providing a tubular adapter which is provided for the connection of the filler tube to the fuel tank;
      wherein the adapter is produced from at least two material components,
      wherein the first material component of the at least two material components is provided to structurally stiffen the adapter and the second material component of the at least two material components is provided to form the integrally bonded connection to the tube portion and;
   c) connecting the adapter to the tube portion by a connecting device;
   wherein, in method step c),
      a lateral surface of the adapter is connected to a lateral surface of the tube portion by an integrally bonded connection,
      the adapter and the tube portion are arranged so as to overlap in the region of the integrally bonded connection,
      wherein the lateral surface of the adapter is, in the region of the integrally bonded connection, formed from a plastic which is welded to the plastic of the tube portion,
      wherein the adapter in the region of the integrally bonded connection is two-layered comprising a first layer and a second layer,
      wherein the lateral surface of the adapter is provided by the first layer and formed of the second material component,
      wherein the first layer covers a main body being the second layer,
      wherein the second layer is formed of the first material component, and
      wherein the adapter comprises at least two circular cylindrical portions of different diameter, which are each connected to one another via a conical transition, wherein a first circular cylindrical portion of the at least two circular cylindrical portions and the conical transition comprises the lateral surface connected to the tube portion such that the first circular cylindrical portion and the conical transition of the adapter are both in direct contact with the tube portion.

12. The method as claimed in claim 11, wherein, in step b), at least one of the following steps is performed:
   inserting the adapter into an end-side opening of the tube portion; and/or
   positioning the adapter on a pin, and inserting the pin and the adapter into an end-side opening of the tube portion.

13. The method as claimed in claim 12, wherein, during the insertion of the adapter into the tube portion, a fluid flow between the lateral surfaces to be connected is generated in order to form an air gap, between the lateral surfaces.

14. The method as claimed in claim 11, wherein, in method step c), the following steps are performed:
   plasticizing at least one of the lateral surfaces by an introduction of heat; and
   pressing the lateral surface of the adapter against the lateral surface of the tube portion, or vice versa.

15. The method as claimed in claim 14, wherein the adapter and the tube portion are pressed against one another by radial advancement of at least two slide inserts which are part of the connecting device, wherein the adapter is held on a pin such that the adapter and the tube portion are pressed radially against one another between the slide inserts and the pin.

16. The method as claimed in claim 11, further comprising:
   providing a cutting tool which circumferentially engages around the adapter; and
   separating off excess tube material by the cutting tool, wherein the cutting tool is formed in two parts.

* * * * *